United States Patent [19]

Shiell et al.

[11] Patent Number: 5,935,241
[45] Date of Patent: Aug. 10, 1999

[54] MULTIPLE GLOBAL PATTERN HISTORY TABLES FOR BRANCH PREDICTION IN A MICROPROCESSOR

[75] Inventors: Jonathan H. Shiell; George Z. N. Cai, both of Plano, Tex.

[73] Assignee: Texas Instruments Incorporated, Dallas, Tex.

[21] Appl. No.: 08/987,951

[22] Filed: Dec. 10, 1997

Related U.S. Application Data

[60] Provisional application No. 60/032,549, Dec. 10, 1996.

[51] Int. Cl.$^6$ ........................................... G06F 9/32
[52] U.S. Cl. ........................... 712/240; 712/239; 712/238
[58] Field of Search ................................. 395/586, 580, 395/581, 583, 585, 582, 587, 584; 712/240, 239, 238, 234, 236, 237, 235, 233

[56] References Cited

U.S. PATENT DOCUMENTS 5,574,871  11/1996  Hoyt et al. ................................ 395/376
5,577,217  11/1996  Hoyt et al. ................................ 395/376

OTHER PUBLICATIONS

"The Predictability of Branches is Libraries," Brad Calder, Dirk Grunwald, and Amitabh Srivastava, WRL Research Report 95/6, Oct. 1995.

"A Comparison of Dynamic Branch Predictors that use Two Levels of Branch History," Tse–Yu Yeh and Yale N. Patt, 1993.

"Alternative Implementations of Two–Level Adaptive Branch Prediction," Tse–Yu Yen and Yale N. Patt, 1992.

Pentium Pro Family Developer's Manual, vol. 3: Operating System Writers's Guide, 1996.

"Two–Level Adaptive Training Branch Prediction," Tse–Yu Yeh and Yale N. Patt, 1991.

*Primary Examiner*—Meng-Ai T. An
*Assistant Examiner*—Mackly Monestime
*Attorney, Agent, or Firm*—Rebecca Mapstone Lake; Richard L. Donaldson

[57] ABSTRACT

A microprocessor (10) and a system (300) incorporating the same is disclosed, in which branch prediction is effected in response to the type of program in which branching instructions are contained. A fetch unit (26) includes a branch target buffer (56) and a plurality of pattern history tables (53). Select logic (80) receives signals indicating, for each branching instruction, the type of program containing the instruction, and selects one of the pattern history tables (53) for use in generating a prediction code in response to a portion of a branch history field (BH) in an entry (63) of the branch target buffer (56) corresponding to the instruction address. Disclosed examples of the signals used in selecting the pattern history table (53) include an indication (U/S) of the privilege level (e.g., user-level or supervisor-level) of the instruction. A range register unit (75) for determining whether the instruction is contained within an address range is also disclosed as used in the selection of the pattern history table (53).

24 Claims, 7 Drawing Sheets

MULTIPLE GLOBAL PATTERN HISTORY TABLES FOR BRANCH PREDICTION IN A MICROPROCESSOR

This application claims priority under 35 USC 119 (e) (1) of provisional application number 60/032,549, filed Dec. 10, 1996.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of microprocessors, and is more specifically directed to branch prediction techniques in pipelined microprocessors.

In the field of microprocessors and other programmable logic devices, many improvements have been made in recent years which have resulted in significant performance improvements. One such improvement is the implementation of pipelined architectures, in which multiple microprocessor instructions are processed simultaneously along various stages of execution, so that the processing of subsequent instructions begins prior to the completion of earlier instructions. Because of pipelining, the effective rate at which instructions are executed by a microprocessor can approach one instruction per machine cycle in a single pipeline microprocessor, even though the processing of each individual instruction may require multiple machine cycles from fetch through execution. So-called superscalar architectures effectively have multiple pipelines operating in parallel, providing even higher theoretical performance levels.

Of course, as is well known in the art, branching instructions are commonplace in most conventional computer and microprocessor programs. Branching instructions are instructions that alter the program flow, such that the next instruction to be executed after the branching instruction is not necessarily the next instruction in program order. Branching instructions may be unconditional, such as JUMP instructions, subroutine calls, and subroutine returns. Some branching instructions are conditional, as the branch depends upon the results of a previous logical or arithmetic instruction.

Conditional branching instructions present complexity in microprocessors of pipelined architecture, because the condition upon which the branch depends is not known until execution, which may be several cycles after fetch. In these situations, the microprocessor must either cease fetching instructions after the branch until the condition is resolved, in a "bubble" of empty stages (i.e., potential instruction processing slots) into the pipeline, or must instead speculatively fetch an instruction (in effect guessing the condition) in order to keep the pipeline full, at a risk of having to "flush" the pipeline of its current instructions if the speculation is determined to be incorrect.

The benefit of speculative execution of instructions in keeping the pipeline full, particularly in architectures with long or multiple pipelines, typically outweighs the performance degradation of pipeline flushes, so long as the success rate of the speculative execution is sufficient to achieve the desired performance benefit. Many modern microprocessors therefore follow some type of branch prediction techniques by way of which the behavior of conditional branching instructions may be predicted with some accuracy. One type of branch prediction is referred to as "static" prediction, as the prediction does not change over time or history. A simple static prediction approach merely predicts all conditional branches to be "taken". An improved static branch prediction approach predicts according to branch direction, for example by predicting all conditional branches in the forward direction to be "not taken" and predicting all conditional backward branches (e.g., LOOP instructions in DO loops) to be "taken". Of course, unconditional branches may always be statically predicted as "taken".

Dynamic branch prediction refers to a known technique of branch prediction that uses the results of past branches to predict the result of the next branch. A simple well-known dynamic prediction technique merely uses the results of the most recent one or two conditional branching instructions to predict the direction of a current branching instruction.

A more accurate dynamic branch prediction approach predicts the direction of a branching instruction by its own branching history, as opposed to the branch results of other instructions. This approach is generally incorporated into modern microprocessors by way of a branch target buffer. A conventional branch target buffer, or BTB, is a cache-like table of entries that each store an identifier (a "tag") for recently-encountered branching instructions, a branch history-related code upon which prediction is made, and a target address of the next instruction to be fetched if the branch is predicted as taken (the next sequential address being the address to be fetched for a "not taken" prediction). When a branching instruction is fetched, its address is matched against the tags in the BTB to determine if this instruction has been previously encountered; if so, the next instruction is fetched according to the prediction code indicated in the BTB for that instruction. Newly-encountered branching instructions are statically predicted, as no history is present in the BTB. Upon execution and completion of the instruction, the BTB entry is created (typically, for taken branches only) or modified (for branches already having a BTB entry) to reflect the actual result of the branching instruction, for use in the next occurrence of the instruction.

Various conventional alternative actual prediction algorithms that predict branches based upon the most recently executed branches or upon the branching history of the same instruction, are known in the art. A well-known simple prediction algorithm follows a four-state state machine model, and uses the two most recent branch events to predict whether the next occurrence will be taken or not taken. The four states are referred to as "strongly taken", "taken", "not taken", and "strongly not taken". A "strongly" state corresponds to at least the last two branches (either generally or for the particular instruction, depending upon the implementation) having been taken or not taken, as the case may be. The taken and not taken states (i.e., not a "strongly" state) correspond to the last two branches having differing results, with the next branch result either changing the prediction to the other result, or maintaining the prediction but in a "strongly" state.

A recent advance in branch prediction algorithms uses not only branch history results, but also branch pattern information, in generating a prediction of branch behavior. For example, a certain branch instruction may be a loop of three passes, such that its branch history will repetitively follow a pattern of taken-taken-not taken. Use of a simple two-bit, or four-state, prediction mechanism will not correctly predict the branching of this instruction, even though its behavior is entirely predictable. The well-known two-level adaptive branch prediction mechanism, described in Yeh & Patt, "Two-Level Adaptive Branch Prediction", *Proceedings of the 24th International Symposium on Microarchitecture,* (ACM/IEEE, November 1991), pp. 51–61, uses both branch history and branch pattern information to predict the results of a branching instruction. Branch prediction using the Yeh & Patt approach has been applied to microprocessor architectures using BTBs, as described in U.K. Patent Application 2 285 526, published Jul. 12, 1995. Attention is also directed, in this regard, to U.S. Pat. No. 5,574,871.

According to the approach described in the above-referenced Yeh and Patt paper and U.K. Patent Application 2 285 526, a pattern history is maintained and updated for each unique branch pattern. In this approach, the pattern history consists of the four-state state machine model described above, in which the two most recent branch events for each branch pattern predicts whether the next occurrence of a branch having the same branch pattern will be taken or not taken (along with its "strongly" attribute). In operation, upon detection of a branching instruction having an entry in the BTB, the branch pattern contained in the branch history field for that instruction indexes into the pattern history table, from which the prediction is obtained. Upon resolution of the branch, both the branch history field for the particular instruction and the pattern history for its previous pattern (i.e., the branch pattern used in the prediction) are updated. The updated pattern history is then available for use in predicting the outcome of the next branch instruction having its associated branch pattern in its branch history field of the BTB. The pattern history table according to this approach is thus "global", in the sense that the branch prediction is generated for any branch instruction having the same branch history pattern, regardless of the identity of the instruction. Accordingly, the pattern history for a particular branch pattern will be defined and updated based upon the branch prediction results for any branching instruction having that branch history. The branch prediction for any given instruction will thus be determined based upon the branch results of other, dissimilar, instructions, according to this basic two-level technique.

As described in Yeh and Patt, "Alternative Implementations of Two-Level Adaptive Branch Prediction", *Conference Proceedings of the 19th Annual International Symposium on Computer Architecture,* (ACM, May 1992), pp. 124–134, an alternative implementation of two-level branch prediction addresses this limitation. This alternative implementation provides address-specific pattern history tables, such that each entry in the BTB has its own pattern history table, as shown in FIG. 3 of this paper. Accordingly, the branch prediction for a branching instruction is made based upon the pattern history as generated and modified by its own past history, and is not dependent upon the branch results for other branching instructions having similar branch patterns.

While the use of address-specific pattern history tables eliminates interference in the branch prediction from other branching instructions having the same branch patterns, the cost of implementation can be quite substantial. For example, modern microprocessors may have BTBs with up to as many as 4 k entries. The use of an index of four bits of branch history into address-specific pattern history tables thus requires 4 k pattern history tables, each with sixteen entries that are two bits in width, resulting in 128 kbits of storage. The chip area required for implementation of this approach is thus quite substantial. This cost rapidly increases, however, as branch prediction is sought to be improved through the use of additional branch history bits as the index to the pattern history tables; for example, the use of six branch history bits would require 512 kbits of pattern history storage. As microprocessors continue to have more pipelines, each deeper in stages, resulting in more severe penalties for branch misprediction and thus a higher premium on accurate branch prediction, the cost of implementing address-specific pattern history tables becomes even greater.

By way of further background, it has been observed that microprocessor programs of different types have similarities in branch behavior within the type, and dissimilarities across types. For example, as described in Calder and Grunwald, "The Predictability of Branches in Libraries", *Proceedings of the 28th International Symposium on Microarchitecture* (ACM/IEEE, November 1995), pp. 24–34, commonly used UNIX library subroutines tend to have predictable branching behavior and, as a class or type, different branching behavior from non-library programs.

By way of further background, indexing into a global pattern history table using both branch history and a portion of the tag field of the BTB is known.

BRIEF SUMMARY OF THE INVENTION

It is therefore an object of the present invention to provide branch prediction in a microprocessor that is based upon program type.

It is a further object of the present invention to provide such branch prediction in which dissimilar branching instructions do not modify branch pattern history tables.

It is a further object of the present invention to provide such branch prediction in which similar branching instructions can set the branch pattern history for a branching instruction that is newly encountered, thus improving branch prediction for first instances of branching instructions.

Other objects and advantages of the present invention will be apparent to those of ordinary skill in the art having reference to the following specification together with its drawings.

The present invention may be implemented into a microprocessor by providing multiple global pattern history tables. The pattern history tables are global in the sense that the pattern history for each entry is generated and updated by the results of multiple branching instructions. The multiple pattern history tables each correspond to branching instructions from different sources, for example from supervisor or user code in an x86 architecture microprocessor, from instructions residing in selected windows of memory space, from the state of a global bit in a page table entry for the page frame in memory from which the instruction was fetched, or from other control information corresponding to the type of program containing the instruction. Each of the global pattern history tables thus provides prediction information for branching instructions from its type of program, to take advantage of the similarity of branch behavior for programs of similar types and to reduce interference from dissimilar branch behavior from branching instructions of programs of different types.

DETAILED DESCRIPTION OF THE INVENTION

Figure 1:
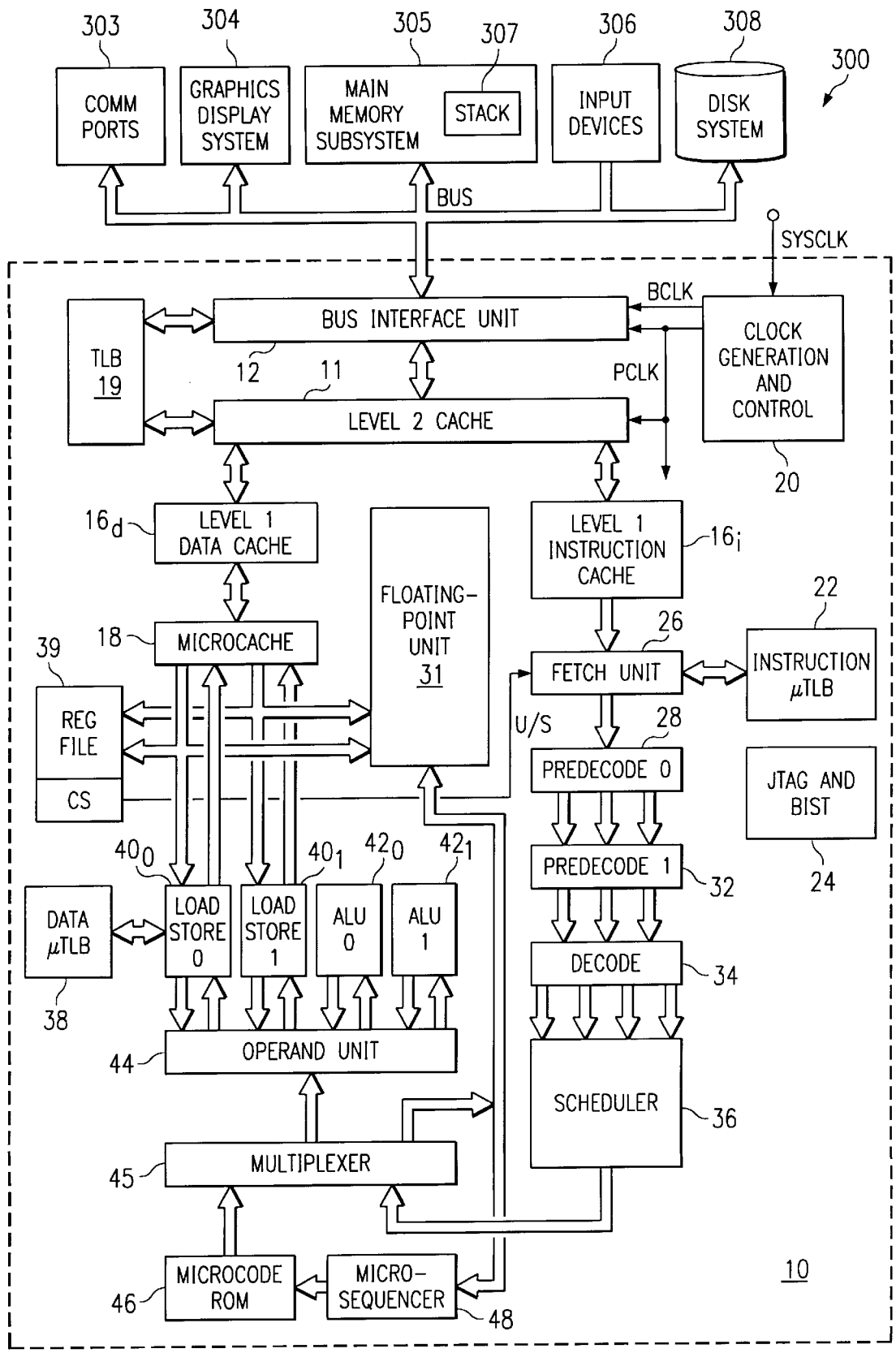
FIG. 1 is an electrical diagram, in block form, of a microprocessor and system constructed according to the preferred embodiments of the invention.

Referring now to FIG. 1, an exemplary data processing system 300, including an exemplary superscalar pipelined microprocessor 10 within which the preferred embodiment of the invention is implemented, will be described. It is to be understood that the architecture of system 300 and of microprocessor 10 is described herein by way of example only, as it is contemplated that the present invention may be utilized in microprocessors of various architectures. It is therefore contemplated that one of ordinary skill in the art, having reference to this specification, will be readily able to implement the present invention in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 10, as shown in FIG. 1, is connected to other system devices by way of external bus BUS. While external bus BUS, in this example, is shown as a single bus, it is of course contemplated that external bus BUS may represent multiple buses having different speeds and protocols, as is known in conventional computers utilizing the PCI local bus architecture. System 300 contains such conventional subsystems as communication ports 303 (including modem ports and modems, network interfaces, and the like), graphics display system 304 (including video memory, video processors, a graphics monitor), main memory system 305 which is typically implemented by way of dynamic random access memory (DRAM) and which may include memory stack 307, input devices 306 (including keyboard, a pointing device, and the interface circuitry therefor), and disk system 308 (which may include hard disk drives, floppy disk drives, and CD-ROM drives). It is therefore contemplated that system 300 of FIG. 1 corresponds to a conventional desktop computer or workstation, as are now common in the art. Of course, other system implementations of microprocessor 10 can also benefit from the present invention, as will be recognized by those of ordinary skill in the art.

Microprocessor 10 includes bus interface unit (BIU) 12 connected to external bus BUS, which controls and effects communication between microprocessor 10 and the other elements in a system 300. BIU 12 includes the appropriate control and clock circuitry to perform this function, including write buffers for increasing the speed of operation, and including timing circuitry so as to synchronize the results of internal microprocessor operation with bus BUS timing constraints. Microprocessor 10 also includes clock generation and control circuitry 20 which generates clock phases based upon system clock SYSCLK; in this example, clock generation and control circuitry 20 generates bus clock BCLK and core clock PCLK from system clock SYSCLK.

Figure 2:
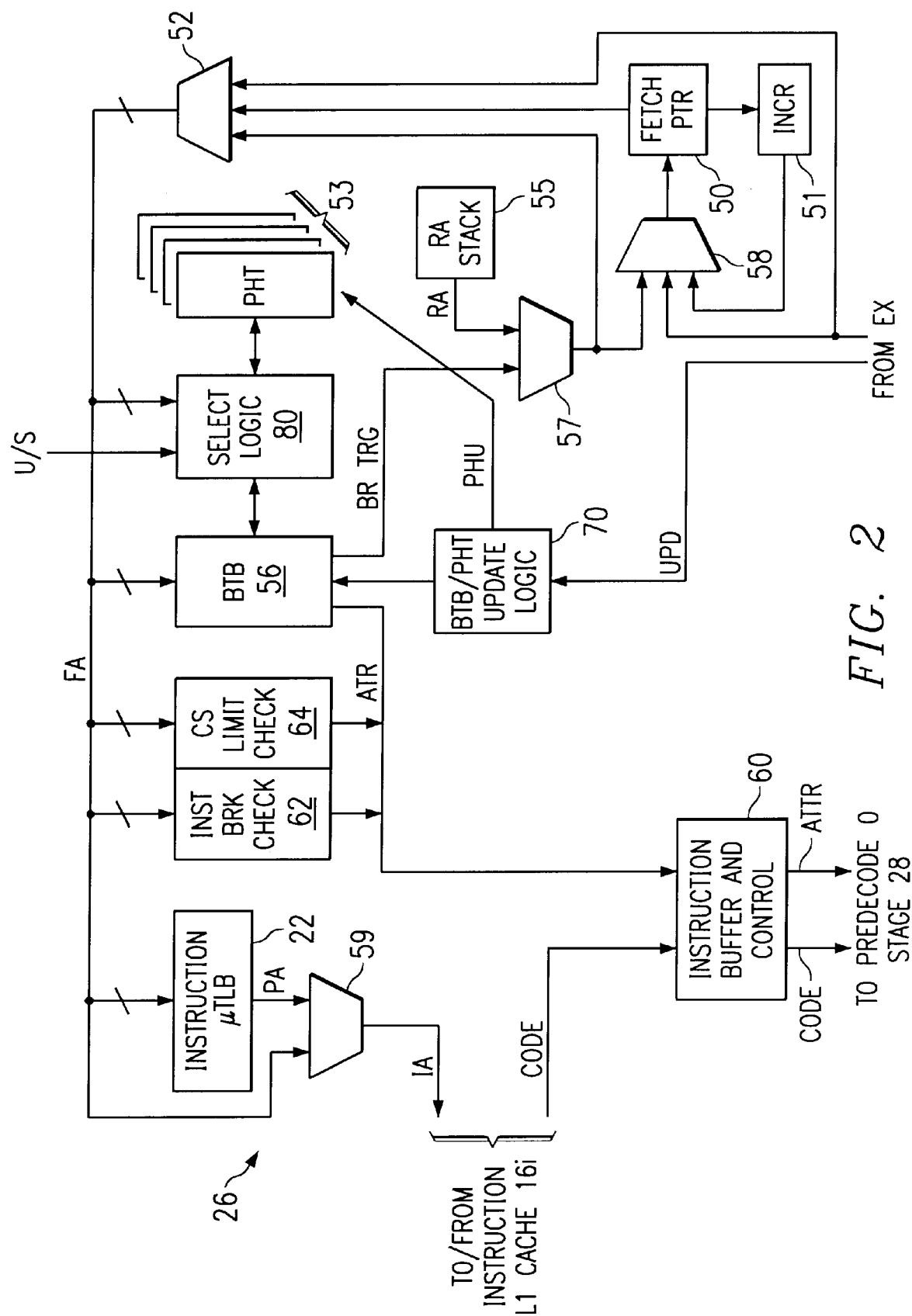
FIG. 2 is an electrical diagram, in block form, of the fetch unit in the microprocessor of FIG. 1 according to the preferred embodiments of the invention.

As is evident in FIG. 1, microprocessor 10 has three levels of internal cache memory, with the highest of these as level 2 cache 11, which is connected to BIU 12 by way of an internal bus. In this example, level 2 cache 11 is a unified cache, and is configured to receive all cacheable data and cacheable instructions from bus BUS via BIU 12, such that much of the bus traffic presented by microprocessor 10 is accomplished via level 2 cache 11. Microprocessor 10 may also effect bus traffic around cache 11, by treating certain bus reads and writes as "not cacheable". Level 2 cache 11, as shown in FIG. 2, is connected to two level 1 caches 16; level 1 data cache $16_d$ is dedicated to data, while level 1 instruction cache $16_i$ is dedicated to instructions. Microcache 18 is a fully dual-ported level 0 data cache, in this example. Main translation look-aside buffer (TLB) 19 controls memory accesses to level 2 cache 11 and to main memory via BIU 12, such control including the sequencing of accesses to the page tables in memory for address translation. TLB 19 also serves as a cache for the page tables. Instruction microtranslation lookaside buffer ($\mu$TLB) 22 and data microtranslation lookaside buffer ($\mu$TLB) 38 are provided to translate logical data addresses into physical addresses for accesses to level 1 instruction cache $16_i$ and level 1 data cache $16_d$, respectively, in the conventional manner.

As shown in FIG. 1, microprocessor 10 is of the superscalar type, and thus includes multiple execution units. These execution units include two ALUs $42_0$, $42_1$ for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. As conventional in the art, register file 39 includes general purpose registers that are available for programmer use, and also control registers including code segment register CS.

These multiple execution units are controlled by way of multiple pipelines of seven stages each, with write-back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units (including FPU 31) |

-continued

| | |
|---|---|
| OP | Operand: This stage retrieves the register operands indicated by the AOps |
| EX | Execute: This stage runs the execution units according to the AOps and the retrieved operands |
| WB | Write-back: This stage stores the results of the execution in registers or in memory |

This pipeline, referred to below as the "integer pipeline", operates in combination with the floating-point pipeline of FPU 31 according to the preferred embodiment of the present invention.

Referring back to FIG. 1, the pipeline stages noted above are performed by various functional blocks within microprocessor 10. Fetch unit 26 generates instruction addresses from the instruction pointer by way of instruction microtranslation lookaside buffer ($\mu$TLB) 22, for application to level 1 instruction cache $16_i$, including according to branch prediction techniques as will be described in further detail below; in addition, as will also be described in detail below, fetch unit 26 receives signals on line U/S from code segment register CS indicating the program type, or class, of the current instruction at fetch unit 26. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multibyte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from scheduler 36 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multicycle instructions (such as REP instructions, and instructions that PUSH and POP all registers).

Microprocessor 10 also includes circuitry 24 for controlling the operation of JTAG scan testing, and of certain built-in self-test (BIST) functions, ensuring the validity of the operation of microprocessor 10 upon completion of manufacturing, and upon resets and other events.

Referring now to FIG. 2, the construction and operation of fetch unit 26 according to the preferred embodiment of the invention will now be described. As noted above, fetch unit 26 performs the function of determining the address of the next instruction to be fetched for decode. As such, fetch unit 26 determines the sequence in which instructions are loaded into the pipelines of microprocessor 10, and in this embodiment of the invention thus controls the speculative execution of addresses, particularly by way of branch prediction.

The operation of fetch unit 26 is based upon a logical fetch address FA that is generated according to one of several ways, as selected by multiplexer 52. Fetch address FA may be generated merely from the contents of fetch pointer 50 in fetch unit 26, in the case where the next sequential address is to be fetched for decoding. As shown in FIG. 2, fetch pointer 50 is a register in fetch unit 26, having an output connected to one input of multiplexer 52 and also to incrementer 51. Incrementer 51 advances the value of the fetch address to the next logical instruction (in the case of a superscalar machine, the next logical instruction is not necessarily the next sequential instruction), and applies the advanced fetch address to an input of multiplexer 58 for possible storage in fetch pointer 50 and use in the next fetch. Multiplexer 58 is provided to select the source of updated contents of fetch pointer 50 for the next access. A second way in which the fetch address FA is generated is by one of the execution units (e.g., microsequencer 48) to multiplexer 52, for example in the event of a taken branch that is not predicted by fetch unit 26, or a mispredicted branch; this value is also applied to an input of multiplexer 58, for storing in fetch pointer 50 as appropriate.

Fetch unit 26 also includes circuitry for generating the next fetch address FA out of program sequence. As shown in FIG. 2, fetch unit 26 includes return address stack 55, which is a last-in-first-out (LIFO) memory having several locations, at which return addresses for subroutine calls and subroutine returns are stored for use in speculative execution of subroutines. In this embodiment of the invention, fetch unit 26 also includes branch target buffer (BTB) 56, which is a cache-like arrangement of entries that store data indicating the prior history of branches from which the current instance of a branching instruction may be predicted, along with target addresses of branching instructions for use as the fetch address FA, so that the pipeline may be maintained in a filled condition as often as possible. In this embodiment of the invention, BTB 56 is of the two-level type, and as such operates in combination with multiple pattern history tables 53 for storing prediction codes that are called by branch history information. As will be described in further detail below relative to the preferred embodiment of the present invention, the appropriate one of pattern history tables 53 that is to be used in generating a branch prediction for a particular address is selected, by select logic 80, according to the type of program in which the branching instruction is contained. As illustrated in FIG. 2, select logic 80 selects from among the pattern history tables 53 in response to information regarding the type of program that contains the current branching instruction, such as communicated on line U/S which is derived from code segment register CS; in addition, as shown, the actual fetch address on lines FA may be used in selecting the appropriate pattern history table 53 based upon the memory location of the branching instruction corresponding to the fetch address on lines FA. In this manner, the branch prediction success rate is improved, by taking advantage of similarities in branch behavior exhibited by programs of the same type (e.g., application programs, shared libraries, operating system functions).

In response to branch predictions based upon corresponding prediction codes in pattern history tables 53, BTB 56 presents target instruction addresses to multiplexer 57 on bus BR TRG; return address stack 55 presents return instruction addresses to multiplexer 57 on bus RA. The output of multiplexer 57 is connected to the third input of multiplexer 52, and to multiplexer 58 so that fetch counter 50 may be updated. The three inputs to multiplexer 52 thus present three sources for the next fetch address FA, which is a logical address as opposed to a physical address.

The results of branch prediction are communicated on lines UPD from the appropriate execution unit to update logic 70. As will be described in detail below, update logic 70 updates branch history in the entries of BTB 56, and also updates the prediction codes stored in pattern history tables 53, in response to the success or failure of branch predictions, as evaluated in execution.

Fetch address FA is presented to various functions in fetch unit 26 to control the fetching of the next instruction for decoding. For example, fetch unit 26 is in communication with instruction μTLB 22, which returns a physical address PA matching the logical fetch address FA if it points to a location that has previously been translated; alternatively, the logical fetch address FA will be translated into a physical address by a main translation unit (not shown) that is external to fetch unit 26. In any event, an instruction line address IA is presented by fetch unit 26 to level 1 instruction cache $16_i$ to retrieve a line of instruction codes therefrom; of course, if a cache miss at level 1 instruction cache $16_i$ occurs, the physical address is presented to unified level 2 cache 11 and, in the event of a cache miss at that level, to main memory. In response to instruction line address IA, level 1 instruction cache $16_i$ presents a line of instruction code sequences CODE to instruction buffer and control 60 in fetch unit 26, for eventual presentation to predecode 0 stage 28. In this case, where each instruction line address IA is used to address a block of sixteen bytes, instruction buffer and control 60 has a capacity of at least sixteen bytes.

Fetch unit 26 also includes other conventional functions, such as instruction break check circuit 62 which halts additional fetching for instructions identified as breaks. Fetch unit 26 also includes a code segment limit check circuit 64, for determining whether logical fetch address FA points to an address outside the limit of the bounds of the current code segment.

Figure 3:
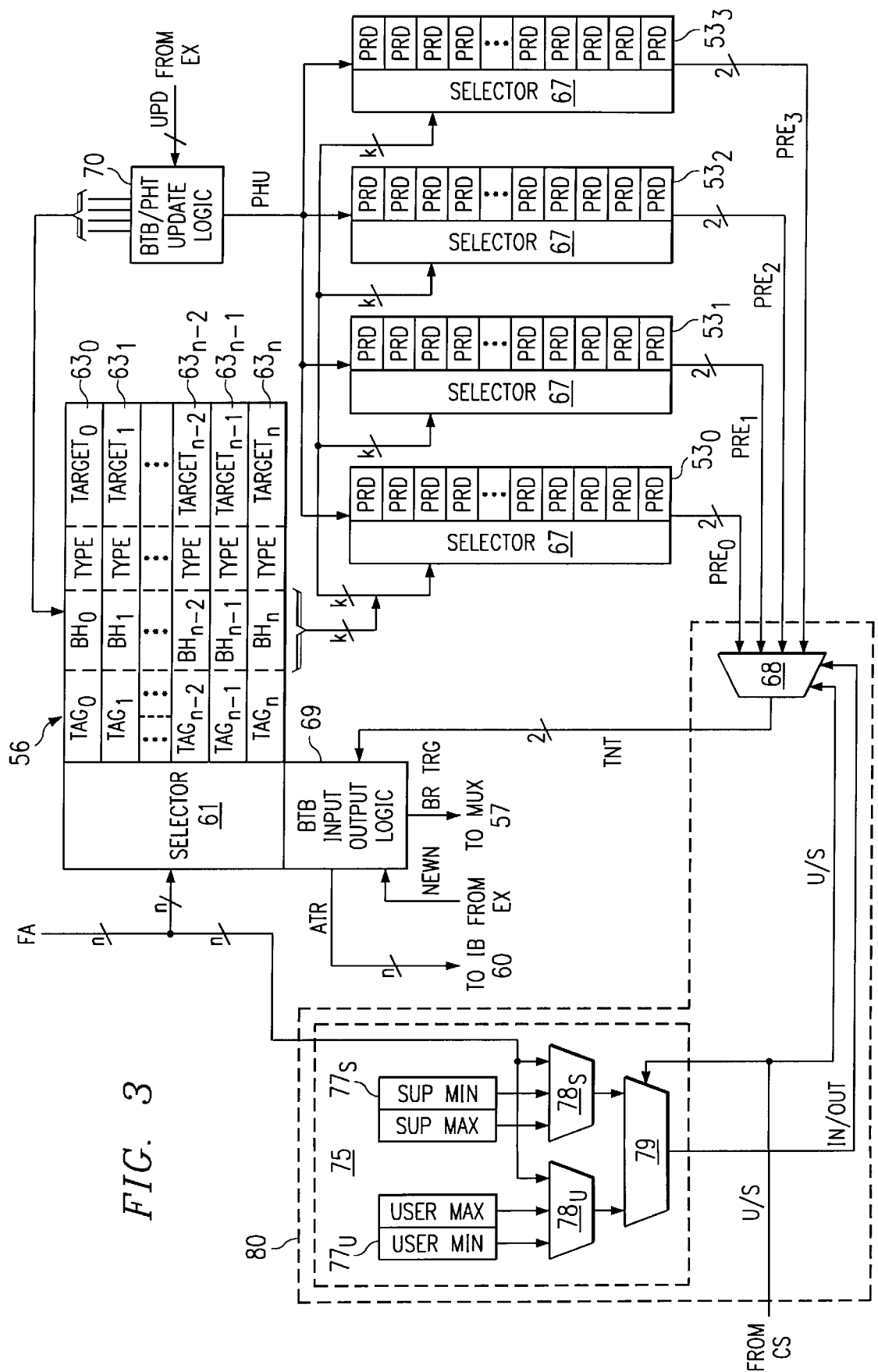
FIG. 3 is an electrical diagram, in block and schematic form, of the branch target buffer, pattern history tables, and associated circuitry in the microprocessor of FIG. 1 according to a first preferred embodiment of the invention.

Logical fetch address FA is connected to an input of BTB 56, which determines whether fetch address FA points to a branch instruction that has recently been fetched, and which may have branch history stored in BTB 56 for use in speculative execution. As is known in the art, speculative execution is an important performance enhancement in deeply pipelined microprocessors such as superscalar microprocessor 10 of FIG. 1, as mispredicted branches (or pipeline stalls awaiting the results of a conditional branch) result in severe penalties, measured in lost execution opportunities. BTB 56 is a memory arranged in a cache-like configuration, for example as a 512 entry, four-way set-associative cache buffer; of course, BTB 56 may be organized in any manner from direct-mapped to fully-associative. Referring now to FIG. 3, the construction of BTB 56, in combination with an example of select logic 80 and multiple pattern history tables 53, will now be described.

As noted above, BTB 56 in this example is a four-way set-associative cache memory having multiple entries 63; only one way is illustrated in FIG. 3, for the sake of clarity. BTB 56 includes selector 61 that is coupled to receive the fetch address on lines FA, and to select the appropriate entry 63 to which the fetch address points. Selector 61 may be constructed according to any conventional technique for performing the selection of an entry 63 in BTB 56 from the fetch address, such as by way of a decoder, tag comparator, or simple multiplexer. Each entry 63 in BTB 56 has a tag field TAG used to identify it with the logical fetch address FA of a specific branching instruction, against which selector 61 compares a portion of the incoming logical fetch address FA. Tag field TAG may directly store selected bits of the logical fetch address FA of its corresponding branching instruction, or may instead correspond to a logical combination of these selected logical address bits, as is known in the art. Typically, tag field TAG will include a line address and an offset indicating the byte offset of the instruction in the fetch line. Each entry 63 in BTB 56 also has target field TARGET which contains the logical address of the branch instruction target address. The target address in portion TARGET of an entry 63 that matches a branch instruction predicted as taken will be presented by BTB input/output logic 69 to multiplexer 57 on bus BR TRG, as noted above. If the branch is not taken, merely the next sequential logical address (i.e., the contents of fetch pointer 50) will be selected by multiplexer 52 as the next logical fetch address FA.

According to this embodiment of the invention, each entry 63 also includes an m-bit branch history field BH which stores the branch history for the branching instruction corresponding to tag field TAG. The branch history stored in branch history field BH includes both the actual branch history of the associated branching instruction as determined upon completion of the execution of the instruction, and also speculative branch history consisting of the predicted result for those instances of the branching instruction which have not yet completed execution. In addition, as described in copending U.S. Provisional Application No. 60/020,844 filed Jun. 28, 1996, and incorporated herein by this reference, each entry 63 of BTB 56 may also include a counter that indicates the number of speculative branch history bits in branch history field BH, for use in recovery from a misprediction. Each entry 63 of BTB 56 also includes indicator TYPE, which describes the branch instruction type for its associated instruction (i.e., conditional branch, CALL, JUMP, or RETURN) for use in predicting the branch; unconditional branches, such as CALL, JUMP, and RETURN are predicted as always taken. Additional bits such as LRU bits, valid bit, and other control bits (not shown), are also provided in each entry 63 of BTB 56.

As noted above relative to FIG. 2, multiple pattern history tables (PHTs) 53 are used to predict the behavior of conditional branches based upon the most recent k bits of branch history field BH for the selected BTB entry 63. According to this embodiment of the invention, each PHT 53 is associated with programs of a particular type, such that the branch history field BH is able to access any one of PHTs 53, but where the prediction code is selected from only the one of PHTs 53 appropriate for programs of the type from which the instruction was fetched. While FIG. 2 illustrates that PHTs 53 are implemented as physically separate circuitry from BTB 56, it will of course be understood that PHTs 53 may be included within BTB 56, as desired. In this example, as apparent in FIG. 3, four PHTs $53_3$ through $53_0$ are implemented in combination with BTB 56.

Each PHT 53 is a simple lookup memory, each having a selector 67 that receives k branch history bits from the selected entry 63 of BTB 56 and that selects the one of its $2^k$ prediction entries PRD corresponding thereto. Selector 67 may be implemented as a decoder or a multiplexer, for performing this function. As illustrated in FIG. 3, each of PHTs $53_3$ through $53_0$ receive the k branch history bits from the selected entry 63, and present a pattern history code on a respective set of lines $PRE_3$ through $PRE_0$ corresponding to the contents of the entry PRD corresponding to the k branch history bits applied thereto. Other information may be combined with these k bits of branch history field BH, such as certain address bits and also control information, in indexing into the selected one of PHTs 53. In this embodiment of the invention, two lines are included within each set PRE, for communicating a two-bit pattern history code in the conventional manner under the four-state branch prediction model (i.e., strongly taken, taken, not taken, and strongly not taken).

According to this embodiment of the invention, select logic 80 includes circuitry for communicating the output of the selected one of PHTs 53 to be applied to BTB 56; of course, select logic 80 may be alternatively implemented to selectively address the appropriate one of multiple PHTs 53. In this example, pattern history lines $PRE_3$ through $PRE_0$ from PHTs $53_3$ through $53_0$, respectively, are applied to inputs of multiplexer 68. Multiplexer 68 selects one of the sets of pattern history lines $PRE_3$ through $PRE_0$ for application on lines TNT to BTB input/output logic 69, from which the appropriate branch prediction will be made. In this embodiment of the invention, multiplexer 68 is controlled in response to a signal on line IN/OUT generated by range register unit 75, and according to a signal on line U/S that, in this example, corresponds to the state of the current privilege level (CPL) contained in the code segment CS register of microprocessor 10, which is constructed in this example according to the x86 architecture. As will be apparent from the following description, multiplexer 68 selects the appropriate set of lines $PRE_3$ through $PRE_0$ for use in making the branch prediction, according to the type or class of program from which the branching instruction emanated, as will now be described.

According to the x86 architecture, programs executed by microprocessor 10 may be classified according to different privilege levels, from kernel (highest privilege) to applications (lowest privilege). As such, individual instructions are resident in portions of memory for which access is protected according to the various privilege levels; this operation permits certain programs and subroutines to be shared by multiple application programs operating in a multitasking environment. These portions of memory are referred to in the memory paging protection mechanism of the x86 architecture as user and supervisor levels; the user protection level (CPL=3) is assigned to those memory locations at which application programs are stored, while the supervisor protection level (CPL=0 through 2) is assigned to those memory locations at which operating system extensions, drivers, and the kernel are resident. Accordingly, the signal on line U/S which, according to this example, is based upon the value of CPL in code segment CS, and indicates the privilege level of the program containing the current branching instruction.

Of course, the type of the program with which the current branching instruction is associated may be indicated in other ways, such as by way of multiple signal lines corresponding to the CPL in an x86 architecture, or by other types of signals in microprocessors according to other architectures. In any event, multiplexer 68 is controlled according to at least one signal that corresponds to the current program type, where the branching behavior may differ for branching instructions of different types of programs. According to this preferred embodiment of the invention, BTB 56 and pattern history tables 53 are implemented to take advantage of the similarity in branching behavior for branching instructions in application programs (instructions resident in user-level memory), the similarity in branching behavior for branching instructions in the operating system (instructions resident in supervisor-level memory), and the similarity in branching behavior for instructions in shared routines of either level, along with the dissimilarity in branching behavior among branching instructions in programs of these different types. This is implemented, according to this preferred embodiment of the invention, by assigning at least one of PHTs 53 for use in connection with user-level branching instructions and at least one of the other PHTs 53 for use in connection with supervisor-level branching instructions. According to this implementation, two PHTs 53 are assigned to user-level branches and the other two PHTs are assigned to supervisor-level branching instructions. The signal on line U/S is applied to one of the control inputs of multiplexer 68 to effect such control in this embodiment of the invention.

According to this embodiment of the invention, selection of the appropriate one of PHTs 53 may also be made according to whether the instruction appears within a user-definable range of memory addresses, where a particular application or subroutine may be known to have distinct branching behavior from other programs of its same (e.g., user or supervisor level) type. For example, library routines, which are located in specific areas of memory, have been observed to have different branching behavior from other types of programs, as described in the above-referenced Calder and Grunwald paper. According to this embodiment of the invention, range register unit 75 is provided to determine if the fetch address of the branching instruction applied to BTB 56, and for which a branch prediction is being made, is within the user-defined window; the result of this determination is communicated to multiplexer 68 on line IN/OUT, as shown in FIG. 3.

Range register unit 75 includes user range registers 77u and supervisor range registers 77s, each of which may be written to with memory addresses. User range registers 77u thus store a user range minimum address value and a user range maximum address value; similarly, supervisor range registers 77s store a supervisor range minimum address value and a supervisor range maximum address value. Range registers 77 are writeable registers, under the control of the programmer; for example, range registers 77 could be activated by way of a user-level program according to a known memory map characterization of the operating system, or may instead be simply written with the bounds of specific programs of each type for which the branching behavior is known to differ from other programs of its privilege level. The contents of user range registers 77u are applied to two inputs of comparator 78u, as is the fetch address on lines FA (or at least a portion thereof); similarly, the contents of supervisor range registers 77s and the fetch address on lines FA (or, again, a portion thereof) are applied to inputs of comparator 78s. Comparators 78u, 78s each compare the value of the fetch address to the contents of their respective range registers 77u, 77s, respectively, and issue a signal at their outputs corresponding to whether the fetch address is within or outside of the memory address range indicated by the corresponding range registers 77u, 77s. The outputs of comparators 78u, 78s are applied to multiplexer 79, which drives a signal at its line IN/OUT corresponding to the output of the one of comparators 78u, 78s selected by the state of line U/S. For fetches to user-level memory, line U/S controls multiplexer 79 to apply the output of comparator 78u to line IN/OUT; for fetches to supervisor-level memory, line U/S controls multiplexer 79 to apply the output of comparator 78s to line IN/OUT. Line IN/OUT is applied to a second control input of multiplexer 68, to assist in the selection of the appropriate one of PHTs 53 for use in the branch prediction of the current address.

An example of the selection of PHTs $53_3$ through $53_0$ by multiplexer 68 according to the preferred embodiment of the invention follows the truth table:

| User/Supervisor | IN/OUT of range register window | PHT selected |
|---|---|---|
| User | IN | $53_0$ |
| User | OUT | $53_1$ |
| Supervisor | IN | $53_2$ |
| Supervisor | OUT | $53_3$ |

As noted above, the range register window for user-level programs is specified by the contents of range registers 77u, while the range register window for supervisor-level programs is specified by range registers 77s. As such, two choices of program types for each of the user and supervisor level programs are available for branch prediction according to the preferred embodiment of the invention.

The output of multiplexer 68, on line TNT, is applied to BTB input/output logic 69, as noted above. BTB input/output logic 69 presents a valid branch target address, corresponding to the TARGET portion of the current entry 63 in BTB, in the event that the prediction code on lines TNT applied thereto indicate a predicted-taken branch; BTB input/output logic 69 also will indicate on lines ATR, to instruction buffer and control 60, the corresponding branch prediction for the current instruction. In addition, BTB input/output logic 69 receives appropriate tag, target, offset, type, and history information for newly-encountered branching instructions on lines NEWN from the execution units, and writes this information into a selected entry 63 in the conventional manner. Control bits, such as LRU and the like, are used in selection of the entry 63 into which information for the new instruction is to be written, as known in the art.

BTB 56 also includes update logic 70 which receives signals on bus UPD from the execution units (e.g., ALUs 42) that indicate the results of previously predicted branching instructions. Update logic 70 is constructed in the conventional manner for circuitry to update the contents of entries 63 in BTB 56 according to whether the associated branches were successfully predicted or mispredicted. In addition, considering that PHTs 53 are adaptive in nature, update logic 70 also drives lines PHU to PHTs 53 to update, in the conventional manner, the contents of prediction code entries PRD according to the results of the prediction of executed branch instructions. According to the preferred embodiment of the invention, however, signals in lines PHU generated by update logic 70 will select the appropriate one of the multiple PHTs 53 that is to be updated for the completed branch. The adaptive updating of pattern history tables is known in the art, for example as described in the above-referenced Yeh and Patt papers.

The operation of BTB 56 in combination with the multiple global pattern history tables 53 according to the preferred embodiment of the invention will now be described relative to FIG. 3. Of course, BTB 56 is not operable for non-branching instructions fetched by addresses on lines FA. For those branching instructions that have not been recently encountered (and thus do not have a valid entry 63 in BTB 56 assigned thereto at this time), selector 61 will not find a matching tag in any of the TAG fields of entries 63, and will return a miss, or "fall-through", signal on lines ATR to instruction buffer and control 60. In this case, a valid branch target address will not be presented on bus BR TRG to multiplexer 57, and multiplexer 52 will select another source (typically fetch pointer 50) for the next logical fetch address FA. Upon completion of the execution stage for this branching instruction, BTB 56 will be updated via BTB input/output logic 69 in the conventional manner, using information provided thereto on lines NEWN so that a valid entry 63 is assigned to this branching instruction.

For unconditional branching instructions that have previously been encountered and that therefore have a corresponding entry 63 in BTB 56 (i.e., for which the portion of fetch address FA matches the TAG field of an entry 63), as indicated by the TYPE portion of its corresponding entry 63, BTB 56 will present a "taken" prediction to instruction buffer and control 60 on lines ATR, and will present the target address from the TARGET field of this entry 63 on bus BR TRG to multiplexer 57, for use by multiplexer 52 as the source of the next instruction address, in the conventional manner. In the case of subroutine RETURN instructions, which are also unconditional branching instructions, multiplexer 57 selects the appropriate return address on lines RA from return address stack 55 for application to multiplexer 52 as the source of the next instruction address, in the conventional manner.

If selector 61 of BTB 56 determines that the current fetch address on lines FA corresponds to a conditional branching instruction having a valid entry 63, BTB 56 forwards k bits of the branch history field BH of the valid entry 63 to each of PHTs $53_3$ through $53_0$. These k bits correspond to the k most recent predictions for that branching instruction, which may include only actual branch results or which may also include speculative branch predictions which have not yet been evaluated. These k bits of branch history field BH of the selected entry 63 are typically referred to as the current branch pattern for the current branching instruction. According to this preferred embodiment of the invention, selector 67 within each of PHTs $53_3$ through $53_0$, decodes these k bits to select the appropriate prediction code entry PRD matching the current branch pattern, and forwards the contents of the selected prediction code entry PRD to multiplexer 68 on its associated output lines $PRE_3$ through $PRE_0$. Each prediction code entry PRD preferably contains a two-bit code, indicating one of the four possible prediction states of taken, not taken, strongly taken, and strongly not taken.

Meanwhile, a portion of the fetch address on lines FA is forwarded to range register unit 75, along with the signal on line U/S indicating whether the current branching instruction is user or supervisor level code. The fetch address on lines FA is compared against the contents of user range registers 77 u by comparator 78u, and against the contents of supervisor range registers 77s by comparator 78s, to detect if the current fetch address is within or outside of the address range specified thereby. The result of the one of comparators 78u, 78s indicated by the state of line U/S is then applied to line IN/OUT by multiplexer 79. The states of lines IN/OUT and U/S also control multiplexer 68 to select one set of output lines $PRE_3$ through $PRE_0$ for application to BTB input/output logic 69 of BTB 56 via lines TNT. As noted above, lines TNT preferably communicate a two-bit code indicating one of the taken, not taken, strongly taken, and strongly not taken prediction states. BTB input/output logic 69 then derives a prediction based upon the code on lines TNT, and forwards this prediction ("taken" or "not taken") to instruction buffer and control 60 on lines ATR. If the prediction is "taken", TARGET field of the corresponding entry 63 is presented on bus BR TRG for selection by multiplexers 57 and 52 as the next logical fetch address FA; if the prediction is "not taken", a valid target address is not presented on bus BR TRG, and multiplexer 52 is controlled to select the incremented output of fetch pointer 50 as the address for the next instruction to be fetched. Following the generation of a prediction, and in the case where BTB 56 stores speculative branch history in the branch history fields BH of entries 63, update logic 70 will then update branch history field BH in the entry 63 corresponding to the current instruction. The prediction information for the current branching instruction, along with identification information for the instruction and for the entries in BTB 56 and the appropriate PHT 53 used in generation of the prediction, will also be passed along with the instruction along the pipeline. Alternatively, a small identifier for the current branching instruction may be forwarded along the pipeline, where the identifier points to a location within a local store at or near fetch unit 26 that will be used to update BTB 56 and the appropriate one of PHTs 53.

Upon completion of the branching instruction, the appropriate execution unit will forward the actual result of the branch to update logic 70 on lines UPD. Update logic 70 then generates the appropriate signals to branch history field BH in the entry 63 of BTB 56 corresponding to the completed instruction to verify the corresponding prediction as correct or incorrect. In addition, update logic 70 updates the appropriate prediction code entry PRD in the appropriate one of PHTs 53 according to the actual results of the branch, by way of lines PHU (which necessarily include the necessary signals for selecting the proper PHT 53 and the appropriate entry PRD therein).

As a result of the preferred embodiment of the present invention, significant improvement in the branch prediction rates for typical microprocessor programs is obtained. Firstly, similarities in branching behavior for programs of particular types is used to advantage, in that pattern history tables are made available for all entries in the BTB, but are individually assigned to instructions of a particular type. This ensures that branch prediction for a particular branching instruction is not contaminated by the results of branching instructions having the same branch history pattern, but from programs of a different type. This improvement in branch prediction is obtained at a relatively modest chip area cost, as only the small size of the pattern history table is reproduced, preferably for relatively few types of programs. Furthermore, because branch prediction codes are assigned to branch history values according to program type (and are not dedicated per BTB entry), the "cold" encountering of a new branching instruction can retrieve a prediction code from the pattern history table for the same branch history as generated by instructions in similar programs, thus providing a relatively high confidence prediction for a newly encountered branch.

Figure 4:
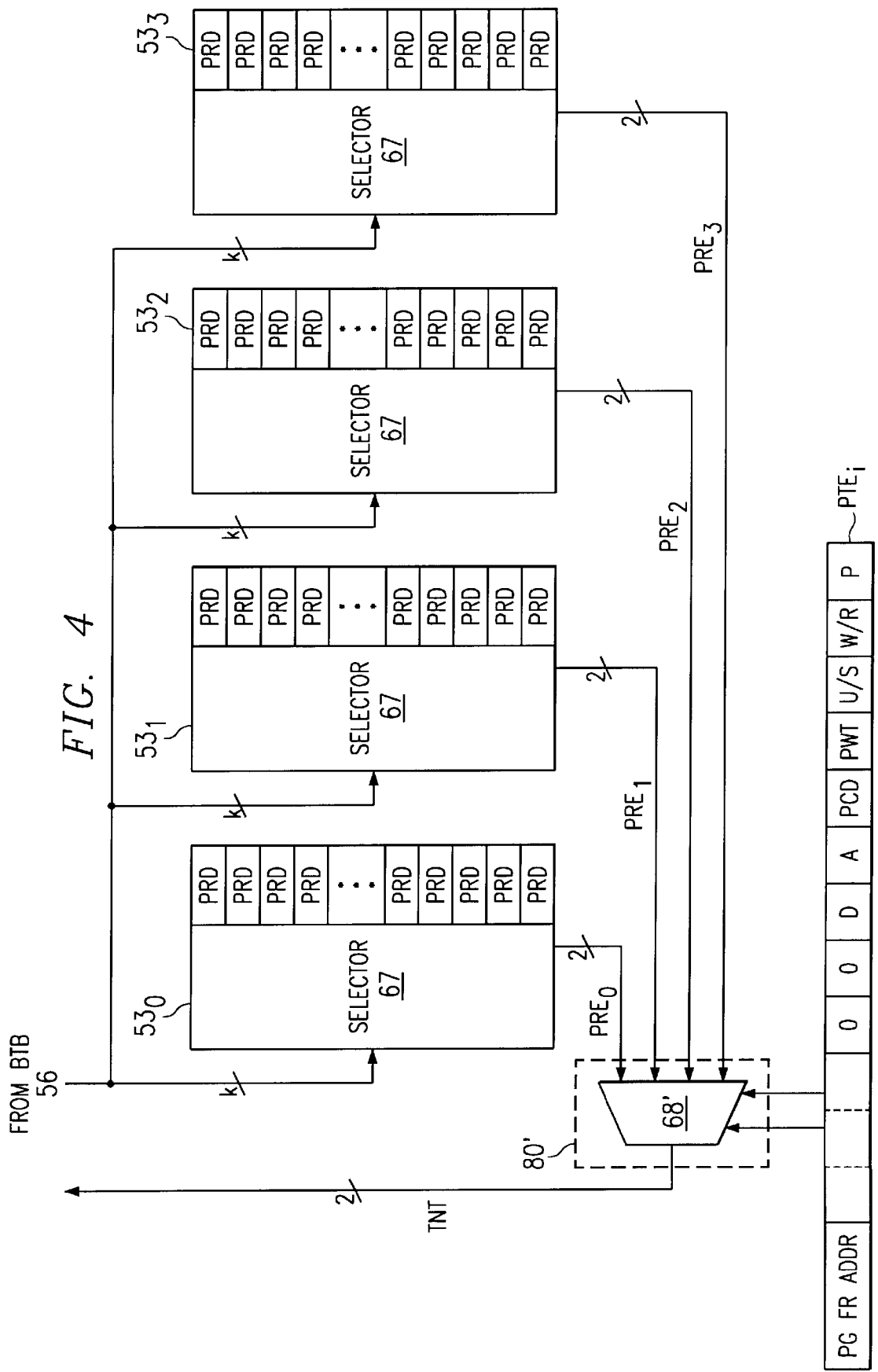
FIG. 4 is an electrical diagram, in block and schematic form, of the branch target buffer, pattern history tables, and associated circuitry in the microprocessor of FIG. 1 according to a second preferred embodiment of the invention.

Various alternatives in the implementation of the present invention are also contemplated, particularly in the way in which the pattern history table is selected. Referring now to FIG. 4, an alternative embodiment of the invention will now be described, with the same reference numerals used for similar elements as described above.

As shown in FIG. 4, PHTs $53_3$ through $53_0$ are provided, as before, each of which present, upon a corresponding pair of output lines $PRE_3$ through $PRE_0$, the contents of a prediction code entry PRD selected by its selector 67 in response to k bits of the branch history field BH of an entry 63 in BTB 56. Select logic 80' in this embodiment of the invention, includes multiplexer 68' that selects one of the sets of lines $PRE_3$ through $PRE_0$ under the control of signals applied to its control terminals.

According to this embodiment of the invention, the control signals applied to multiplexer 68' correspond to the contents of two bits in the page table entry $PTE_i$ corresponding to the current fetch address. As is well known in the microprocessor field, and as noted above, page table entries are used to effect address translation from a logical address to a physical address; in microprocessor 10 as described above, TLB 19 serves as a cache of page table entries PTE, each of which not only include a page frame address within which the current address maps, but can also include certain control information known in the art that pertains to the page frame of memory to which the address points.

In the embodiment of FIG. 4, two bits of page table entry $PTE_i$ contain a code used to select the appropriate one of PHTs 53 for branching instructions fetched from its corresponding memory page frame. For example, conventional page table entries already include bits that are made available to the operating system, or which otherwise are reserved; alternatively, microprocessor 10 could be constructed so as to provide an additional pair of bits for this information. In operation, the operating system under which microprocessor 10 operates would comprehend the availability of multiple PHTs 53 according to this embodiment of the invention, and would write the PHT selection code (i.e., the control signal states to be applied to multiplexer 68') into the page table entries PTE as memory is accessed. In this way, direct addressing of the appropriate pattern history table to be used for branch prediction could be made by the operating system. According to this alternative implementation, range register unit 75 would not be necessary.

Further in the alternative to the embodiment of FIG. 4, other control flags and bits may be used, in combination with the PHT selection code in page table entry $PTE_i$, to select the appropriate PHT 53. For example, as described at pages 3–21 through 3–26 of *Pentium® Pro Family Developer's Manual, Volume 3: Operating System Writer's Guide* (Intel, 1996), incorporated herein by reference, page table entries according to the architecture of the PENTIUM PRO microprocessor include a global (page) bit G which indicates, when set, that its page entry in the translation lookaside buffer is not to be cleared upon a task switch. This permits the assignment of common pages of memory, accessible by several tasks. For example, library routines for programs in the C++ language may be stored in global memory pages, for access by multiple C++ tasks. As noted above relative to the Calder and Grunwald paper, library routines have been observed to have different branching behavior from other types of programs. Accordingly, use of the global bit in selection of the appropriate PHT 53 may be used to benefit in microprocessors having such a bit in their page table entries.

Figure 5:
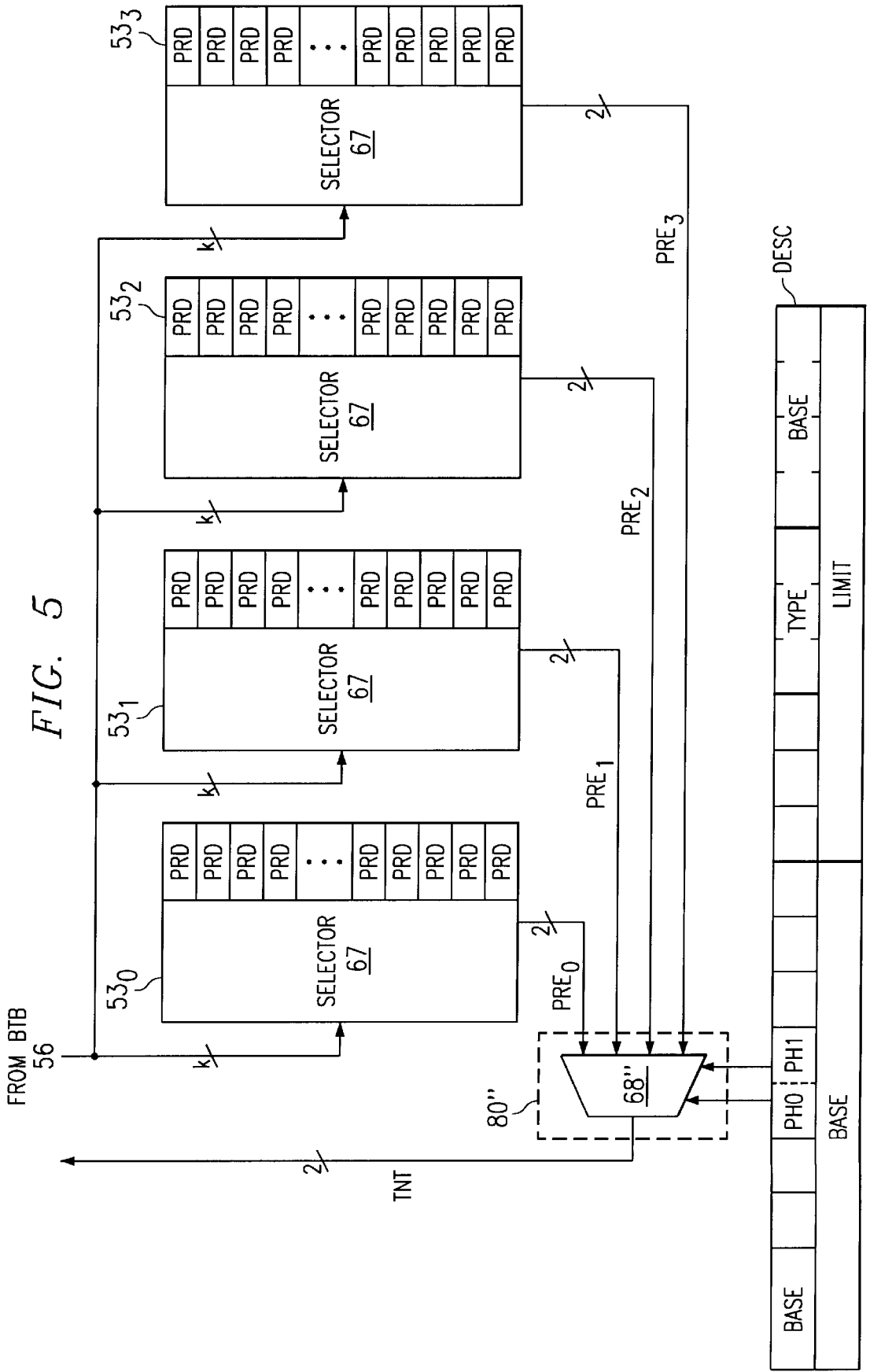
FIG. 5 is an electrical diagram, in block and schematic form, of the branch target buffer, pattern history tables, and associated circuitry in the microprocessor of FIG. 1 according to a third preferred embodiment of the invention.

Referring now to FIG. 5, another alternative embodiment of the present invention will now be described in detail. According to this embodiment of the invention, output lines $PRE_3$ through $PRE_0$ are again generated by PHTs $53_3$ through $53_0$, respectively, in response to a k-bit branch history from field BH of entry 63 of BTB 56, and are applied to inputs of multiplexer 68''' of select logic 80'''. In this embodiment of the invention, however, the selection of the appropriate prediction code on output lines $PRE_3$ through $PRE_0$ is made in response to a pair of bits PH0, PH1 defined within the segment descriptor DESC, which is an entry in either a global or local descriptor table indexed by the segment selector during protected mode operation of an x86 architecture microprocessor. The bits PH0, PH1 may be certain bits that are currently undefined, or alternatively microprocessor 10 may be constructed to extend the segment descriptor to provide these additional bits for use as a selection code for PHTs 53.

Figure 6:
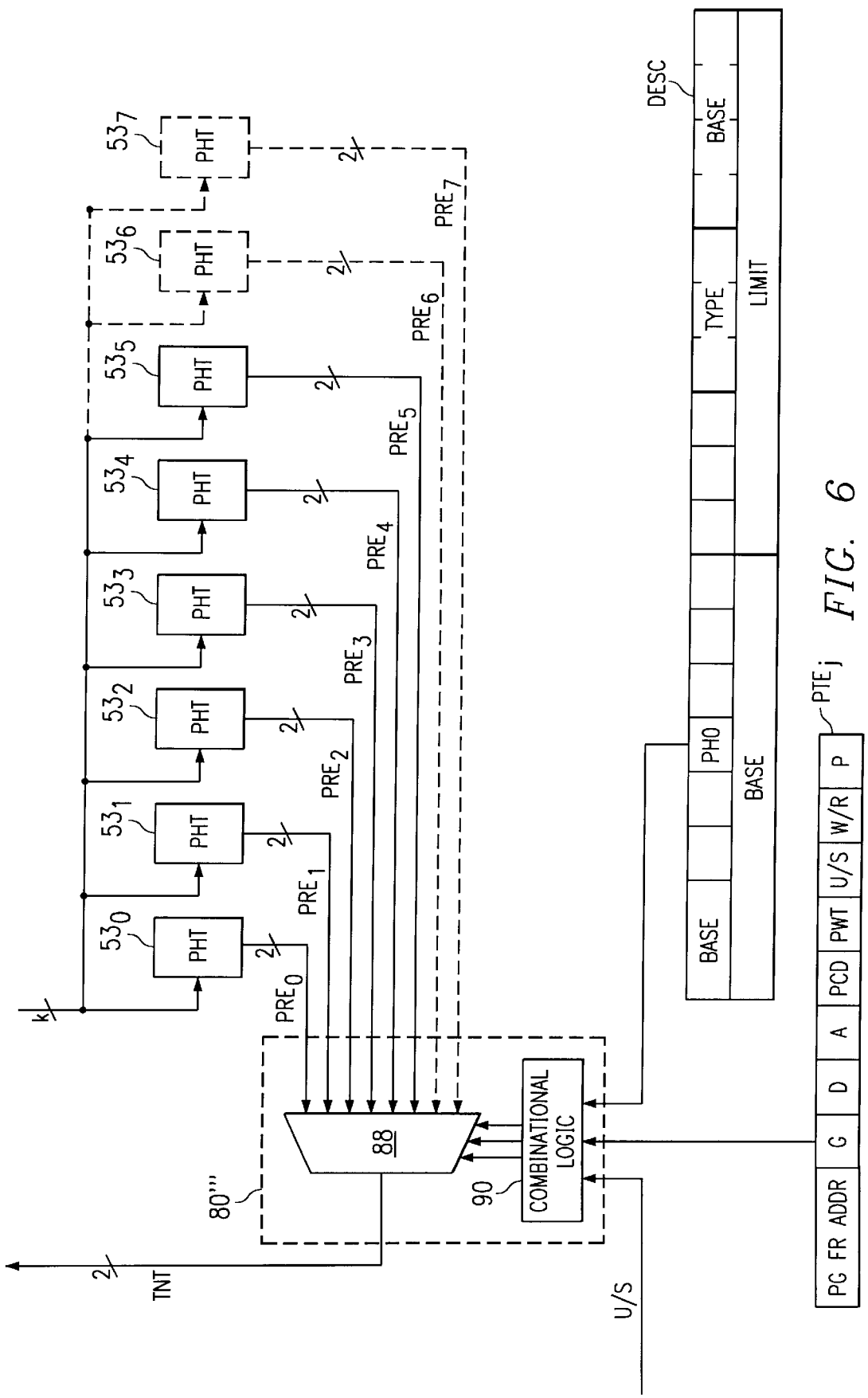
FIG. 6 is an electrical diagram, in block and schematic form, of the branch target buffer, pattern history tables, and associated circuitry in the microprocessor of FIG. 1 according to a fourth preferred embodiment of the invention.

The construction and operation of another alternative embodiment of the invention will now be described relative to FIG. 6. According to this embodiment of the invention, six pattern history tables (PHTs) $53_5$ through $53_0$ are provided in microprocessor 10, providing branch prediction according to a wider range of potential branching behavior types. Each of PHTs 53 present a two-bit prediction code on output lines PRE in response to k bits of branch history applied thereto by BTB 56, as described above. According to this embodiment of the present invention, the eight pairs of output lines $PRE_5$ through $PRE_0$ are applied to multiplexer 88, which in turn selects the desired pair PRE for application to lines TNT in response to three control signals generated by combinational logic 90 in select logic 80''', based upon the type of program in which the current branching instruction resides. Considering that three control signals are applied to multiplexer 88, two additional PHTs $53_7$ and $53_6$ (shown in shadow in FIG. 6) could be included, if desired.

According to this embodiment of the invention, the state of global bit G in page table entry $PTE_j$ (which, as described above, indicates whether its page entry is to cleared from TLB 19 upon a task switch) is forwarded to one input of combinational logic 90, as is the signal on line U/S from code segment CS as described above. A third input of combinational logic 90 receives the state of a programmed PHT selection code PH0 defined within the segment descriptor DESC which, as described above, is an entry in either a global or local descriptor table indexed by the segment selector during protected mode operation of an x86 architecture microprocessor.

In operation, combinational logic 90 selects which of PHTs $53_5$ through $53_0$ is to control the branch prediction, according to the state of the signal on line U/S in combination with the global bit G in the corresponding page table entry $PTE_j$ and the state of the programmed PHT selection bit PH0 in the segment descriptor DESC. According to this alternative embodiment of the invention, the state of the programmed PHT selection bit PH0 is irrelevant for supervisor-level code, but is determinative of the selection of PHTs 53 for user level code. An example of the selection coding according to this embodiment of the invention is as follows:

| User/Supervisor Level | Global bit | PHT selection bit PH0 | Selected PHT 53 |
|---|---|---|---|
| Supervisor | Set | Don't care | PHT $53_0$ |
| Supervisor | Clear | Don't care | PHT $53_1$ |
| User | Set | Set | PHT $53_2$ |
| User | Set | Clear | PHT $53_3$ |
| User | Clear | Set | PHT $53_4$ |
| User | Clear | Clear | PHT $53_5$ |

According to this alternative embodiment of the invention, therefore, the branch prediction may be made according to whether supervisor level code is contained in global memory or not, or according to whether user level code is contained in global memory or not and under programmer control. Accordingly, finer granularity in branch prediction depending upon the branch behavior of various types of programs may be provided according to this embodiment of the invention.

Figure 7:
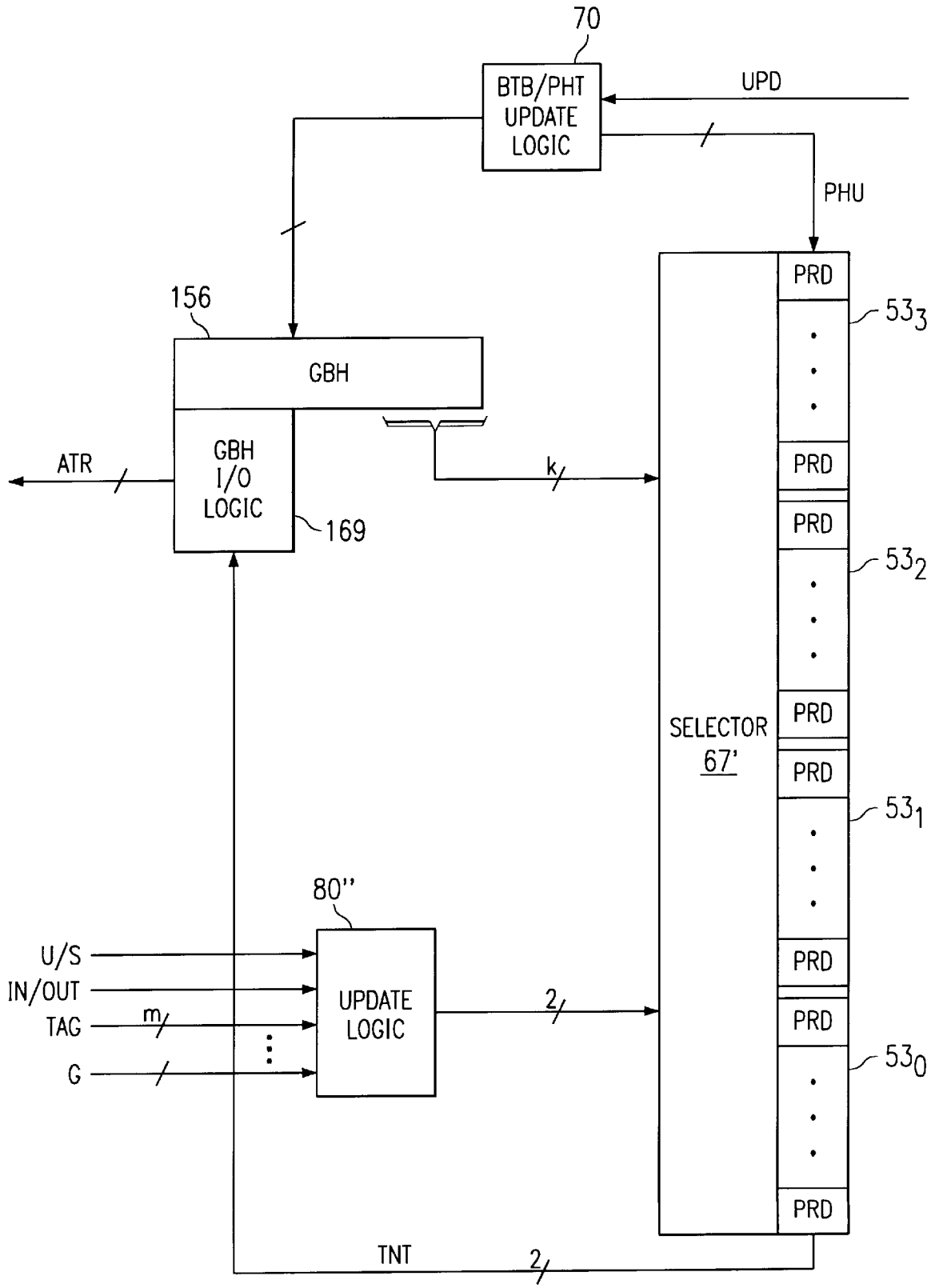
FIG. 7 is an electrical diagram, in block and schematic form, of a branch history buffer, pattern history tables, and associated circuitry in the microprocessor of FIG. 1 according to a fifth preferred embodiment of the invention.

Referring now to FIG. 7, the construction and operation of another embodiment of the present invention will now be described. According to this embodiment of the invention, global branch history (GBH) buffer 156 is used to store and maintain the branch history of all conditional branching instructions encountered by fetch unit 26. As described in the above-referenced Yeh and Patt papers, GBH buffer 156 maintains the branch history without regard to the identity of the branching instructions executed. As such, GBH buffer 156 need not contain the address tag field TAG or a target field TARGET, as the address tag of the branch instruction is not relevant either to the branch prediction or updating of the branch history, and as the target address of the branch is maintained along with the instruction.

Also in this embodiment of the invention, multiple PHTs $53_3$ through $53_0$ store individual branch prediction codes PRD that are selectable according to the k most recent bits of branch history as stored in GBH buffer 156. According to this embodiment of the invention, selection of the appropriate one of PHTs 53 is made by select logic $80^{IV}$ in response to various control signals. Select logic $80^{IV}$ receives control signals on line U/S as derived from code segment CS as before, along with other control signals such as the signal on line IN/OUT from range register unit 75 (not shown), and the global bit G from the descriptor for the instruction. In addition, select logic $80^{IV}$ also receives (on lines TAG) m bits of the fetch address for the instruction, responsive to which the branch prediction may also be made. Of course, the various signals applied to select logic $80^{IV}$ according to this preferred embodiment of the invention are illustrated by way of example only, as more, fewer, or different control signals indicative of the type of program containing the current branch instruction may be used. In any event, select logic $80^{IV}$ generates select signals for selecting one of the multiple PHTs 53 for use in making the branch prediction.

As such, PHTs 53 are logically arranged as shown in FIG. 7, substantially as an arrangement of multiple PHTs 53 into a single megatable; of course, the physical arrangement of PHTs 53 may differ from that shown, for example by having prediction code entries PRD from the various ones of PHTs 53 interleaved among one another.

In operation, upon fetch unit 26 detecting that the current fetch address on lines FA corresponds to a conditional branching instruction, the corresponding control signals for the branching instruction are applied to the inputs of select logic $80^{IV}$, which in turn drives selection signals to selector 67' of PHTs 53 according to the logical combination of the received control signals. In addition, GBH buffer 156 applies the k most recent bits of the global branch history to selector 67'. In this embodiment of the invention, selector 67' thus selects the appropriate prediction code entry PRD according to the k bits of branch history, from the one of PHTs $53_3$ selected by select logic $80^{IV}$, and drives a prediction code on lines TNT that is communicated to GBH input/output logic 169. GBH input/output logic 169 in turn generates a signal on lines ATR to instruction buffer and control 60 (not shown) or such other appropriate logic used in the determination of the next fetch address, based upon the branch prediction generated by GBH buffer 156 and the selected one of PHTs 53.

BTB/PHT update logic 70 receives update information from the execution stages on bus UPD, as before, and updates both GBH buffer 156 and also the appropriate prediction code entry PRD in the proper one of PHTs 53, with the actual branch results obtained upon execution of the branch instruction, in the conventional manner.

The various combinations of control signals and address signals illustrated in the embodiment of the invention illustrated in FIG. 7 may, of course, be used in selecting one of the multiple PHTs in a multiple entry BTB arrangement, as described hereinabove relative to FIGS. 3 through 7, if desired.

According to this embodiment of the invention as illustrated in exemplary fashion in FIG. 7, the benefits of branch prediction made according to the type of program containing the branch instruction may be obtained even in connection with simple branch prediction circuitry, such as the global branch history buffer described in the Yeh and Patt papers referenced above. Such branch prediction would be especially appropriate in architectures where the branch behavior depends more upon the type of program containing the branch instruction than upon the branch history of each individual instruction. It is further contemplated, of course, that the present invention may also be beneficially applied to other branch prediction arrangements besides those described herein.

According to all of these various alternative embodiments of the invention, therefore, improved branch prediction rates are obtained by generating prediction codes based upon branch history information separately, for branching instructions of various types. Accordingly, branch prediction is not contaminated by dissimilar branching behavior of branching instructions from other tasks that happen to have the same branch history, but without requiring huge investments in chip area as required by per-address pattern history tables. Wide flexibility in defining the pattern history tables is also provided by the various embodiments of the invention.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A microprocessor, comprising:
    an execution unit for executing instructions according to a plurality of program types;
    a memory for storing instruction codes of instructions; and
    a fetch unit, for addressing the memory to retrieve instruction codes for execution by the execution unit, comprising:
        a branch history circuit, for storing a sequence of results of branching instructions executed by the execution unit;
        a plurality of pattern history tables coupled to the branch history circuit, each having a plurality of indexed prediction code entries, and each having an output for presenting the contents of one of the prediction code entries corresponding to a branch history field from the branch history circuit;
        an addressing circuit for selecting an address for an instruction to be fetched; and
        select logic, coupled to receive a program type indicator, for selectively forwarding, to the addressing circuit, the output of one of the plurality of pattern history tables corresponding to the program type indicator.

2. The microprocessor of claim 1, wherein the branch history circuit comprises a global branch history buffer.

3. The microprocessor of claim 1, wherein the branch history circuit comprises:
    a branch target buffer comprised of a plurality of entries, each entry having a tag field corresponding to the instruction address of an associated branching instruction, having a branch history field for storing a sequence of previous branches of its associated branching instruction.

4. The microprocessor of claim 3, wherein each of the plurality of entries in the branch target buffer further comprises a target field for storing a branch target address;
    and wherein the addressing circuit, responsive to the select logic forwarding an output corresponding to a branch-taken prediction, selects an address corresponding to the branch target address of the entry corresponding to the associated branching instruction.

5. The microprocessor of claim 1, wherein the program type indicator of a branching instruction comprises a privilege level indicator corresponding to a program containing the branching instruction.

6. The microprocessor of claim 5, wherein the privilege level indicator comprises a bit of a code segment register corresponding to the branching instruction.

7. The microprocessor of claim 1, wherein the program type indicator of a branching instruction comprises at least one bit of a page table entry for a portion of memory containing the branching instruction.

8. The microprocessor of claim 1, wherein the program type indicator of a branching instruction comprises at least one bit of a segment descriptor for a portion of memory containing the branching instruction.

9. The microprocessor of claim 1, wherein the program type indicator of a branching instruction comprises at least one bit of the instruction address of the branching instruction.

10. The microprocessor of claim 1, wherein the select logic comprises:
    a multiplexer having inputs for receiving outputs from each of the plurality of pattern history tables and having an output coupled to the branch history circuit, for selecting the output of one of the plurality of pattern history tables for forwarding to the branch history circuit.

11. The microprocessor of claim 10, wherein the program type indicator for a branching instruction comprises a privilege level indicator corresponding to a program containing the branching instruction;
    and wherein the multiplexer of the select logic has a control input coupled to receive the privilege level indicator.

12. The microprocessor of claim 11, wherein the select logic further comprises:
    logic for generating control signals to the multiplexer responsive to a logical combination of the privilege level indicator and to a global bit of a page table entry for a portion of memory containing the branching instruction.

13. The microprocessor of claim 1, wherein the select logic comprises:
    a first pair of range registers for storing a maximum and a minimum address value, respectively; and
    a first comparator for comparing a portion of the instruction address of a branching instruction to the contents of the first pair of range registers;
wherein the program type indicator comprises the result of the comparing performed by the first comparator.

14. The microprocessor of claim 13, wherein the select logic further comprises:
    a second pair of range registers for storing a maximum and a minimum address value, respectively;
    a second comparator for comparing a portion of the instruction address of the branching instruction to the contents of the second pair of range registers; and
    logic for generating an in/out signal corresponding to the result of a selected one of the first and second comparators, selected responsive to the state of a privilege level indicator corresponding to a program containing the branching instruction.

15. The microprocessor of claim 14, wherein the program type indicator comprises a combination of the state of the in/out signal with the privilege level indicator.

16. The microprocessor of claim 15, wherein the select logic comprises:

a multiplexer having inputs for receiving outputs from each of the plurality of pattern history tables, having an output coupled to the branch target buffer, and having control inputs coupled to receive the in/out signal and the privilege level indicator.

17. A method of operating a pipelined microprocessor to speculatively execute branching instructions in a program of microprocessor instructions, comprising the steps of:

detecting a branch instruction at a fetch stage of the pipelined microprocessor;

responsive to the detecting step, retrieving at least a portion of a branch history field;

determining a program type corresponding to the branch instruction; and generating a branch prediction corresponding to the retrieved portion of the branch history field from one of a plurality of pattern history tables selected according to the program type.

18. The method of claim 17, further comprising:

responsive to the detecting step, applying an instruction address to a branch target buffer, the branch target buffer having a plurality of entries, each having a tag field for storing an instruction identifier, and having a branch history field for storing branch results;

wherein the retrieving step is performed responsive to a portion of the applied instruction address matching the tag field of one of the plurality of entries.

19. The method of claim 17, wherein the determining step comprises:

interrogating the state of a privilege level indicator corresponding to the program containing the detected branching instruction.

20. The method of claim 19, wherein the privilege level indicator comprises a bit of a code segment register corresponding to the detected branching instruction.

21. The method of claim 17, wherein the determining step comprises:

interrogating the state of at least one bit of a page table entry for a portion of memory containing the detected branching instruction.

22. The method of claim 17, wherein the determining step comprises:

interrogating the state of at least one bit of a segment descriptor for a portion of memory containing the detected branching instruction.

23. The method of claim 17, wherein the determining step comprises:

comparing the detected branching instruction address to the contents of a first pair of range registers to determine if the detected branching instruction address is within the range specified thereby.

24. The method of claim 23, wherein the determining step further comprises:

comparing the detected branching instruction address to the contents of a plurality of pairs of range registers to determine if the detected branching instruction address is within the ranges specified thereby; and interrogating the state of a privilege level indicator corresponding to the program containing the detected branching instruction;

and further comprising:

selecting one of the plurality of pattern history tables responsive to the state of the privilege level indicator and to the result of the comparing step performed by one of the plurality of pairs of range registers selected responsive to the state of the privilege level indicator.

\* \* \* \* \*